B. W. ELDER.
NUTCRACKING MACHINE.
APPLICATION FILED OCT. 14, 1910.
998,482.
Patented July 18, 1911.
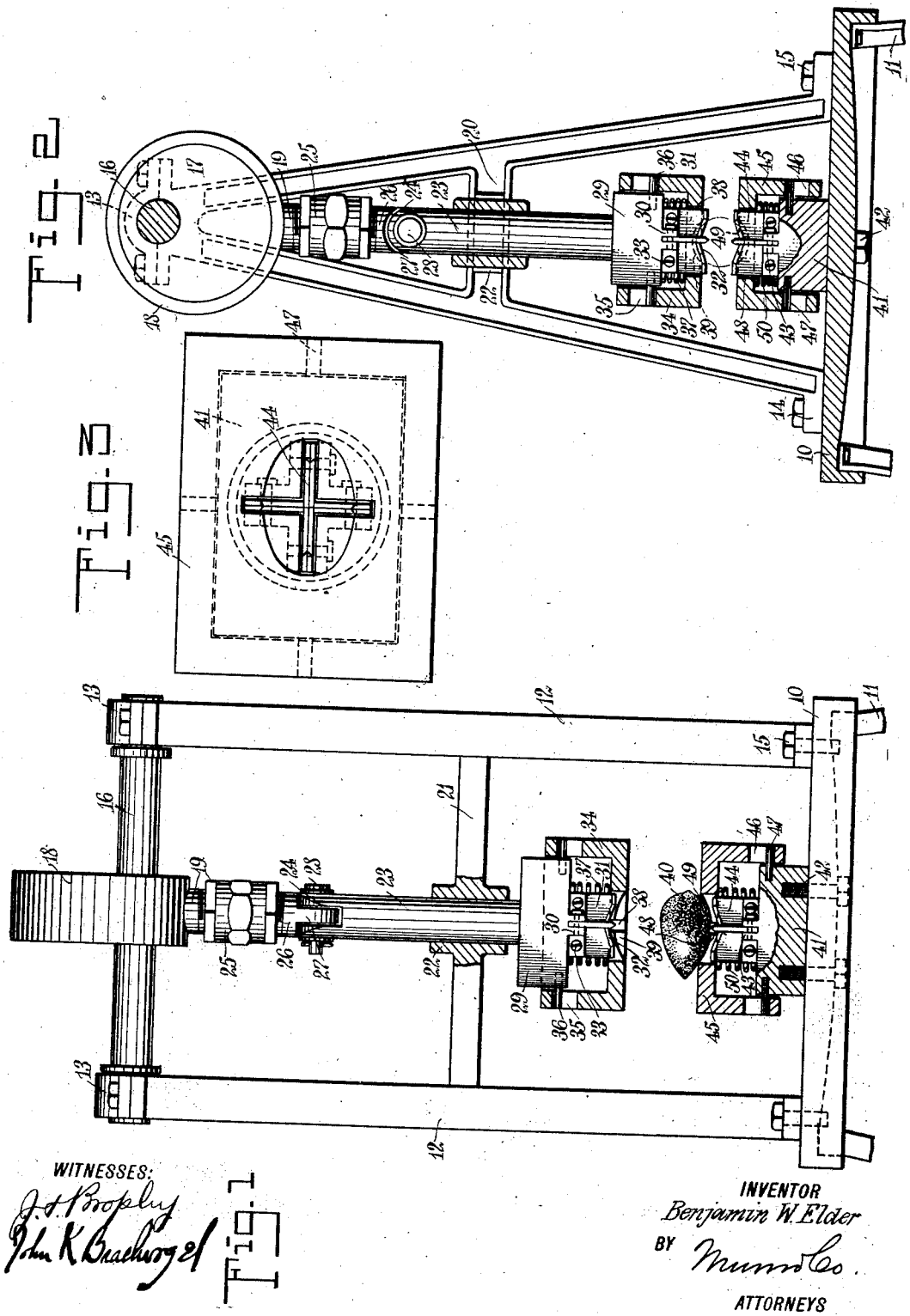
WITNESSES:
INVENTOR
Benjamin W. Elder
BY
ATTORNEYS

UNITED STATES PATENT OFFICE.

BENJAMIN WINCHESTER ELDER, OF SAN ANTONIO, TEXAS.

NUTCRACKING-MACHINE.

998,482.  Specification of Letters Patent.  Patented July 18, 1911.

Application filed October 14, 1910. Serial No. 587,047.

*To all whom it may concern:*

Be it known that I, BENJAMIN W. ELDER, a citizen of the United States, and a resident of the city of San Antonio, in the county of Bexar and State of Texas, have invented a new and Improved Nutcracking-Machine, of which the following is a full, clear, and exact description.

This invention relates to machines for cracking the shells of different kinds of nuts, and has reference more particularly to a machine of this class, which comprises a pair of relatively movable cutter heads, each having a cutter, and means for limiting the penetration of the cutters to prevent injury to the kernels of the nuts.

The object of the invention is to provide a simple, strong and efficient machine for cracking or severing the shells of different kinds of nuts which can be advantageously employed with nuts having extremely hard and tough shells, which is rapid in operation, which requires little power to drive it, which, when in operation, requires practically no supervision, and which will thoroughly crack or sever the shells of the nuts without injury to the kernels.

This invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a partial vertical section of an embodiment of my invention; Fig. 2 is a vertical section of the machine taken at right angles to the section shown in Fig. 1; and Fig. 3 is an enlarged plan view of one of the cutter heads, and the means associated therewith for limiting the penetration of the cutter.

Before proceeding to a more detailed explanation of my invention, it should be clearly understood that while the machine can be successfully used for shelling different kinds of nuts, it is particularly useful in connection with hard- and tough-shelled nuts, such as, the "coquito" nut of Mexico, the botanical name of which is *Attalea cohune*, and the Mexican "palm" nut, the botanical name of which is *Elæis melanococea*. Nuts of this kind have comparatively thick and extremely tough shells which are very difficult to crack or sever. The kernels of the nuts contain valuable oils which can be used for different purposes. My machine is intended to facilitate the obtaining of the kernels rapidly and at comparatively low cost to permit the utilization of these natural products, which are generally wasted. The nuts are usually of elongated form and of circular cross section transversely of the length. They are more pointed at one end than at the other. This peculiar ovoid shape renders it difficult to position the nuts properly for engagement by cutters or other severing implements. For this reason I preferably employ special cutters of cross form, which sever the shells in two directions at substantially right angles.

Certain of the details of construction shown for example in the accompanying drawing form no part of the invention, and can be varied in accordance with individual preference or special conditions without departing from the underlying spirit of the invention.

Referring more particularly to the drawings, I employ a base 10 consisting of a table or like element, having suitable supports 11. Upon the table are mounted standards 12, consisting preferably of V-shaped uprights having at their upper ends, bearings 13, and at the lower ends, laterally disposed flanges 14 secured by means of screws or bolts 15 to the table. A shaft 16 is journaled in the bearings 13 and has rigidly secured thereto, intermediate its ends, an eccentric disk 17, about which is mounted an eccentric strap 18, having a threaded stub or rod extension 19, and serving a purpose which will appear hereinafter. The standards intermediate their ends have transverse connecting members 20, having rigidly secured thereto or formed integrally therewith a cross member 21, which extends from one standard to the other. It has a central guide sleeve 22 in which is movably mounted a rod 23, having the upper end 24 bifurcated. A coupling 25, consisting of a threaded sleeve, serves to connect the stub 19, and a correspondingly threaded member 26 which has a reduced end 27 received between the sides of the end 24 of the rod 23, and pivotally secured in place by pin 28. At the lower end the rod 23 carries a cutter head 29, consisting preferably of a block of angular form having spaced lugs or extensions 30. A cutter 31, of cross form and having the cutting edges 32 centrally reëntrant, is secured between the lugs 30 by means of screws 33 or in any other suitable manner. A box-shaped casing 34 constituting a guard, is movably associated with the cutter head 29, and is of hollow form to receive the cutter head. It has in the sides elongated openings or slots 35, which receive projecting studs of the cutter head whereby the guard has a limited movement relative to the head, a helical spring 37 is positioned between the head and the guard about the cutter, and tends normally to move the guard away from the head. The guard has a central, cross-shaped opening 38 through which the correspondingly formed cutter can be projected when the guard is forced toward the cutter head against the tension of the spring 37. The guard at the opening 38 has a rounded depression or recess 39 formed to receive a nut 40.

A fixed cutter head 41 is secured by means of screws or bolts 42, upon the table under the movable cutter head, and is similar to the latter. It has lugs or extensions 43, to which is attached the cutter 44 similar to the cutter 31. A guard 45, corresponding to the guard 34, is movably associated with the head 41 and has slots 46 which receive studs 47. It has an opening 48, similar to the opening 38 of the other guard, and likewise a depression or recess 49. A spring 50 tends to maintain the guard 45 in a normal position.

Suitable means (not shown) are provided for driving the shaft 16. This in turn operates the eccentric and thus reciprocates the rod 23 so that the cutter heads have a relative movement. When the machine is in operation the nuts are successively placed between the cutter heads, resting in the depression 49 of the lower guard. As the upper cutter head moves downward, the upper guard is brought into engagement with the nut. The further movement of the upper cutter head causes the guards to be displaced against the tension of their respective springs, so that the cutters are projected through the respective openings provided for the purpose, and forced into the shell of the nut to sever the same. The guards limit the penetration of the cutters and thus prevent injury to the kernel of the nut. The cross-shaped cutters and the recesses of the guards prevent the nuts from turning or slipping while the shells are being severed. The movable guards serve to limit the penetration of the cutters, and also act as strippers, when the upper cutter head is moving away from the lower one, so that, as the springs project, the guards, the latter assist in freeing the shells from the cutters.

Having thus described my invention, I claim as new and desire to secure my Letters Patent:

1. A machine of the class described, comprising a pair of relatively movable cutter heads, each having an angularly-shaped cutter, and a guard movably carried by each of said heads, for limiting the penetration of said cutters, said guard being resiliently held in normal positions, and having openings shaped to conform to said cutters, and adapted to have said cutters project through the same in predetermined positions of said guards.

2. A machine of the class described, comprising a pair of relatively movable cutter heads, each having a cross-shaped cutter, and a guard movably carried by each of said heads for limiting the penetration of said cutters, said guards being normally projected beyond said cutters, and having cross-shaped openings through which said cutters can project.

3. A machine of the class described, comprising a pair of relatively movable cutter heads, each having a cross-shaped cutter, guards mounted over said heads, and having limited movements relative thereto, said guards having cross-shaped openings, adapted to receive said cutters, whereby the same can project beyond said guards, in predetermined positions thereof, and springs normally projecting said guards, so that said cutters are retracted.

4. A machine of the class described, comprising a pair of relatively movable cutter heads, each having a cross-shaped cutter, guards mounted over said heads, and having limited movements relative thereto, said guards having cross-shaped openings, adapted to receive said cutters, whereby the same can project beyond said guards, in predetermined positions thereof, and springs normally projecting said guards, so that said cutters are retracted, each of said guards, about its cross-shaped opening, having a depression adapted to receive a nut.

In testimony whereof I have signed my name to this specification in the presence of two subscribing witnesses.

BENJAMIN WINCHESTER ELDER.

Witnesses:
 CARLOS Y. STURRUP,
 HARRY A. MCBRIDE.

Copies of this patent may be obtained for five cents each, by addressing the "Commissioner of Patents, Washington, D. C."